United States Patent
San Miguel Gonzalez et al.

(10) Patent No.: US 12,321,245 B2
(45) Date of Patent: Jun. 3, 2025

(54) METHOD AND SYSTEM FOR RECONCILING VALUES OF A FEATURE

(71) Applicant: FUJITSU LIMITED, Kawasaki (JP)

(72) Inventors: Beatriz San Miguel Gonzalez, Madrid (ES); Aisha Naseer Butt, Hayes (GB); Hiroya Inakoshi, London (GB)

(73) Assignee: FUJITSU LIMITED, Kawasaki (JP)

( * ) Notice: Subject to any disclaimer, the term of this patent is extended or adjusted under 35 U.S.C. 154(b) by 1036 days.

(21) Appl. No.: 17/039,145

(22) Filed: Sep. 30, 2020

(65) Prior Publication Data

US 2021/0097448 A1  Apr. 1, 2021

(30) Foreign Application Priority Data

Sep. 30, 2019 (EP) .................................. 19200635

(51) Int. Cl.
| | | |
|---|---|---|
| *G06N 20/20* | (2019.01) | |
| *G06F 11/18* | (2006.01) | |
| *G06F 18/21* | (2023.01) | |
| *G06N 5/025* | (2023.01) | |

(52) U.S. Cl.
CPC ........ *G06F 11/188* (2013.01); *G06F 18/2185* (2023.01); *G06N 5/025* (2013.01); *G06N 20/20* (2019.01)

(58) Field of Classification Search
CPC ......... G05B 13/0275–048; G06N 5/00; G06N 5/02–025; G06N 5/04–047; G06N 20/20
See application file for complete search history.

(56) References Cited

U.S. PATENT DOCUMENTS

| | | | |
|---|---|---|---|
| 8,560,468 B1 | 10/2013 | Lerman et al. | |
| 8,775,332 B1 | 7/2014 | Morris | |
| 2014/0351337 A1* | 11/2014 | Pal | H04L 67/306 709/204 |
| 2015/0334768 A1* | 11/2015 | Ranasinghe | H04W 4/021 370/328 |
| 2017/0116206 A1* | 4/2017 | Gumerato | G06F 16/275 |
| 2018/0232571 A1* | 8/2018 | Bathiche | G06F 3/167 |

(Continued)

FOREIGN PATENT DOCUMENTS

| | | |
|---|---|---|
| AU | 2018101604 A4 | 10/2018 |
| CN | 107705577 A | 2/2018 |

(Continued)

OTHER PUBLICATIONS

Charisi et al. "Towards Moral Autonomous Systems", 2017, arXiv:1703.04741v3.*

Fujitsu Group AI Commitment, <URL: http://www.fujitsu.com/global/about/resources/news/press-releases/2019/0313-01.html>; Mar. 2019 (1 page).

(Continued)

*Primary Examiner* — Markus A. Vasquez
(74) *Attorney, Agent, or Firm* — STAAS & HALSEY LLP

(57) ABSTRACT

A computer-implemented method of reconciling values of a feature, each value being provided by a different artificial intelligence (AI) system, by collecting logs from the different AI systems, each log including a value of the feature; identifying any discrepancy between the values. When there is any discrepancy, creating global information from the values, the global information taking into account some or all of the values. When the global information differs from the value of one of the AI systems, sending the global information to that AI system.

13 Claims, 14 Drawing Sheets

(56) References Cited

U.S. PATENT DOCUMENTS

| | | | |
|---|---|---|---|
| 2019/0138905 A1 | 5/2019 | Akella et al. | |
| 2019/0162856 A1* | 5/2019 | Atalla | G05D 1/0276 |
| 2019/0212746 A1* | 7/2019 | Cheng | B60W 60/001 |
| 2019/0236865 A1 | 8/2019 | Mercep et al. | |
| 2019/0238433 A1* | 8/2019 | Speasl | H04L 41/0893 |
| 2020/0233426 A1* | 7/2020 | Johnson | G01C 21/3658 |

FOREIGN PATENT DOCUMENTS

| | | |
|---|---|---|
| CN | 108445011 A | 8/2018 |
| CN | 108508826 A | 9/2018 |
| CN | 109383516 A | 2/2019 |
| EP | 3 321 757 A1 | 5/2018 |
| JP | 2003-198545 | 7/2003 |
| JP | 2005-044330 | 2/2024 |
| WO | WO 2019/114991 A1 | 6/2019 |

OTHER PUBLICATIONS

Google, AI Ethics Guidelines Global Inventory: <URL: https://algorithwatch.org/en/project/ai-ethics-guidelines-global-inventory/>; Nov. 9, 2019; (10 pages).

European Commission, Ethics Guidelines for trustworthy AI: <URL: http://ec.uropa.eu/digital-single-market/en/news/ethics-guidelines-trustworthy-ai> retrieved on Apr. 8, 2019 (41 pages).

IEEE, Ethically Aligned Design. First Edition. 2019. <URL: http://ethicsinaction.ieee.org/>; (294 pages).

Vakkuri, Ville, Kai-Kristian Kemell, and Pekka Abrahamsson. "Implementing Ethics in AI; An Industrial multiple case study" arXIV preprint arXIV:1906.12307 (2019) (12 pages).

Barycentric coordinate system: <URL: http://en.wikipedia.org/wiki/Barycentric_coordinate_system> retrieved on Oct. 9, 2019; (8 pages).

European Search Report dated Mar. 26, 2020 in corresponding European application No. EP 19 20 0635.1-1224.

Japanese Office Action issued in counterpart Japanese Application No. 2020-163895 dated May 29, 2024.

* cited by examiner

| ID system | feature 1 | feature 2 | ... | feature n |
|---|---|---|---|---|
| 1 | value1_1 | value1_2 | ... | value1_n |
| 2 | value2_1 | value2_2 | ... | value2_n |
| ... | ... | ... | ... | ... |
| m | valuem_1 | valuem_2 | ... | valuem_n |

FIG. 6

| feature | GI |
|---|---|
| feature1 | GI_1 |

FIG. 7

```
{
  "id": "car_1",
  "x": 428,
  "y": 400,
  "width": 15,
  "height": 30,
  "heading": "n",
  "viewing": [
      {"person_1":{
      "x": 600,
      "y": 200,
      "width": 20,
      "height": 20,
      "heading": "w"}, etc ...
      }
```

FIG. 12

| id | person_1_heading | person_1_height | person_1_width | person_1_x | person_1_y | x_direction |
|---|---|---|---|---|---|---|
| car_1 | w | 20 | 20 | 600 | 450 | 0 |
| car_3 | w | 20 | 20 | 400 | 450 | -1 |
| car_4 | w | 20 | 20 | 600 | 400 | 0 |
| car_2 | w | 20 | 20 | 600 | 450 | 1 |

FIG. 13

METHOD AND SYSTEM FOR RECONCILING VALUES OF A FEATURE

CROSS-REFERENCE TO RELATED APPLICATIONS

This application is based on and hereby claims priority to European Patent Application No. 19200635.1, filed Sep. 30, 2019, in the European Patent Office, the entire content of which is incorporated herein by reference.

FIELD

The present invention related to use of Artificial Intelligence (AI) or autonomous systems. It has numerous applications in everyday life and industry.

BACKGROUND

Contexts, where different AI systems are involved and take autonomous decisions, are increasingly frequent in our society. These raise new challenges, problems, and therefore the need of new solutions to safeguard and promote the welfare of people and society in general.

The growing use and adoption of AI systems has triggered society to think about ethical considerations of AI. Currently, different governments, industries and academic institutions have produced their own principles, guidelines and frameworks for ethics in AI.

Moreover, some technical aspects of addressing ethics in AI systems are investigated, and published. For example, mechanisms to ensure responsibility and the accountability for AI systems and their outcomes before and after their development, deployment and use. This includes auditability, minimization and reporting of negative impacts, trade-offs, and redress; which are vividly related to the EU "Ethics guidelines for trustworthy AI" that includes four main principles: respect for human autonomy; prevention of harm; fairness; and explicability.

Closely linked to the principle of fairness is the requirement of accountability; it may be seen as the set of actions that allows developers to: prepare for anything unexpected (actions are taken to prevent or control an unexpected situation); prepare for error scenarios (actions prevent or control error scenarios); handle errors (to deal with errors in software); and ensure data security (to ensure cyber security of systems and secure handling of data).

SUMMARY

It is desirable to mitigate the potential harm that can arise from increasing use of multiple AI systems. Also, the identification of conflicts in information coming from the AI systems is not only limited to preventing something which 'harms' but also include discrepancies, confusion, or errors in sets of data (information) sent from disparate AI systems. Errors, confusions, discrepancies can be very wide-ranging from errors in information or design or manufacturing but should not be limited to these example.

According to an embodiment of one aspect of the mention there is provided a computer-implemented method of reconciling values of a feature, each value being provided by a different artificial intelligence, AI, system, the method comprising: collecting logs from the different AI systems, each log including a value of the feature; identifying any discrepancy between the values, and when there is any discrepancy; creating global information from the values, the global information taking into account some or all of the values, and when the global information differs from the value of one of the AI systems; sending the global information to that AI system.

BRIEF DESCRIPTION OF DRAWINGS

Preferred features of the present invention will now be described, purely by way of example, with references to the accompanying drawings, in which:

FIG. 6 is a table of information collected;

FIG. 7 is a table showing an example output;

FIG. 12 is a JSON example of information sent by each object;

FIG. 13 is a table of information received by a conflict auditor;

DETAILED DESCRIPTION OF EMBODIMENTS

Figure 1:
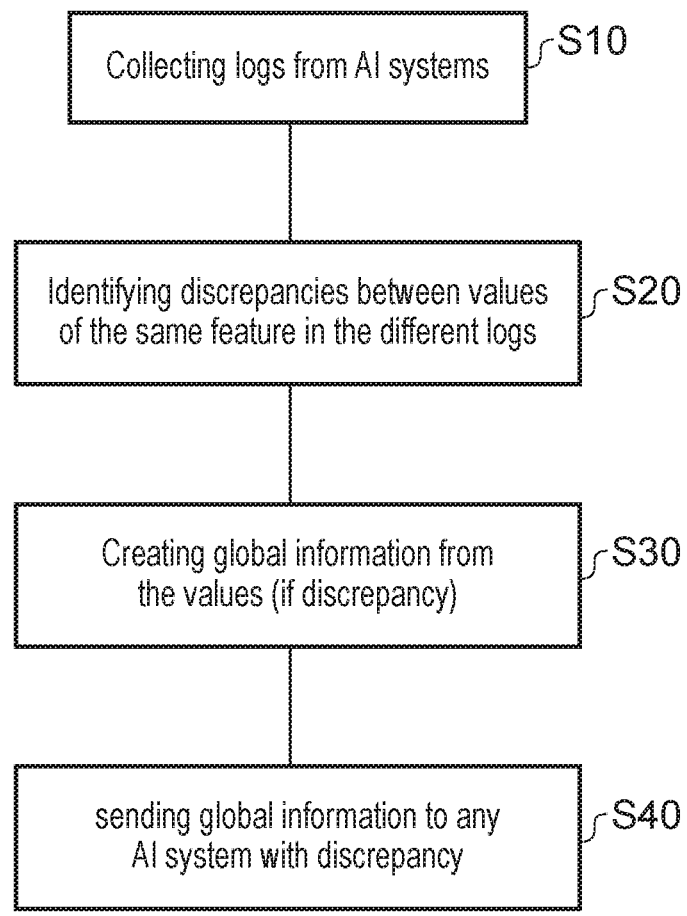
FIG. 1 is a flow chart of a method in a general embodiment.
Figure 2:
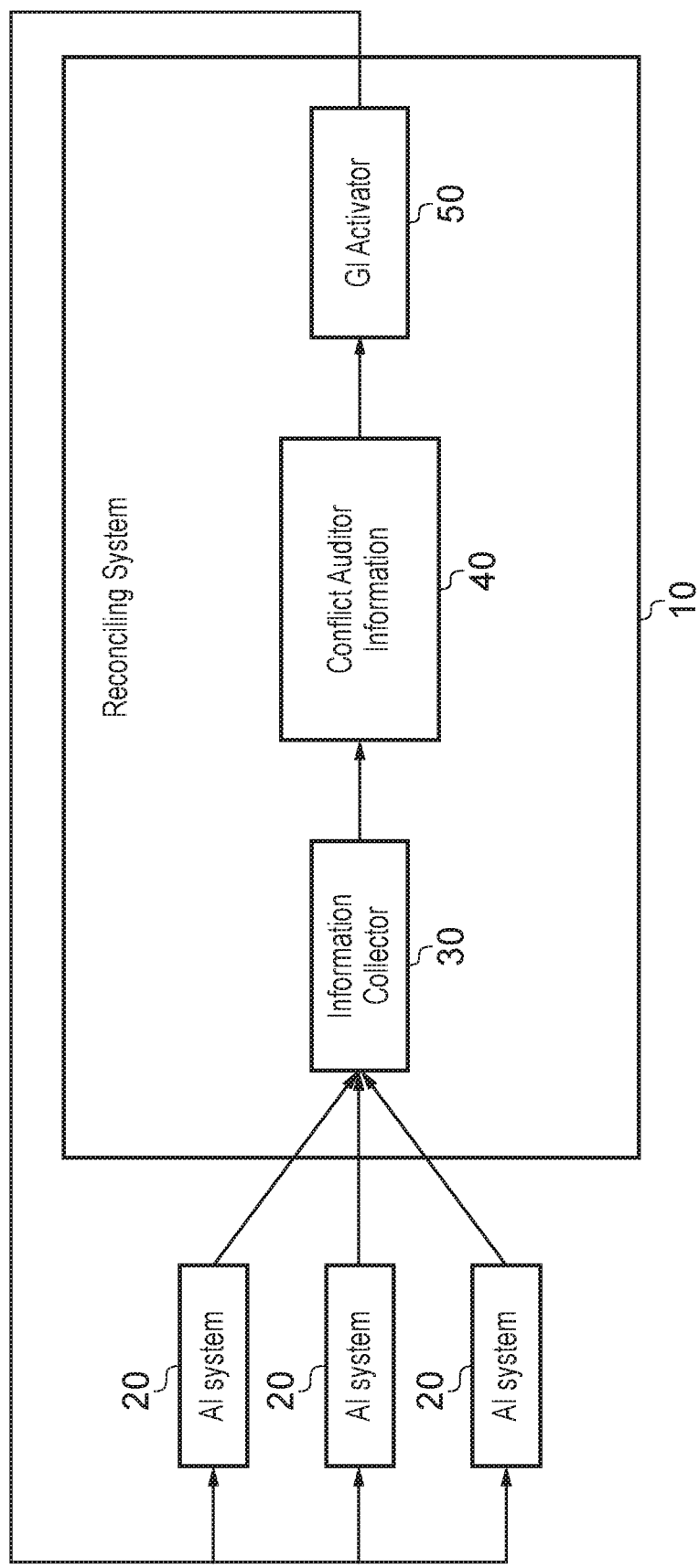
FIG. 2 is a block diagram of main system components in a general embodiment of the invention.

Putting principles and ethics requirements into practice is a challenging task. Invention embodiments provide a first step to allow accountability of AI systems. In particular, embodiments focus on preventing harm caused by errors/failures in (an) AI system(s) that are detected using the collective knowledge of other AI systems that are presented in a same context (physical setting). For this, traceability of the systems and reconciliation of conflicting information is essential.

It is known in the prior art to apply focus on accountability and detect errors to avoid negative impact of AI systems. Also, AI or Deep learning techniques have been applied to create defect detection systems and to calibrate sensors.

To avoid negative impact, other prior art prevents an AI-behaviour body becoming out of control to reduce harm. This solution is based on the analysis of information from an AI system to detect when the AI is out of control and avoid negative outputs and harm to humans.

Unlike invention embodiments, the prior art cannot access information of other AI systems to augment the knowledge from other perspectives and improve the detection of conflicting information.

Embodiments tackle the analysis and reconciliation of contexts (situations or environments) where there is more than one AI system having different perceptions/information of one (or a set of) characteristic(s) or feature in the context and these perceptions could provoke a negative impact.

Values herein may include numerical values or classifications or any other form of value. One example of a context where the embodiments may be applied is a road (or a scenario defined by a set of coordinates) where an accident between two or more vehicles or other objects could happen because one of them perceives wrong positions or classifications of objects (such as one of the vehicles, or a person, or an inanimate object). Another example is a smart factory or other industrial space where different robots perform autonomous decisions to generate products, but defective items could be produced because a robot classifies incorrectly materials.

To solve the problems in the prior art, invention embodiments provide a resolution system that resolves conflicting contexts based on the traceable contextual information of AI systems presented in the context, identifies discrepancies in the information received and calculates new global information (GI) that may be used to resolve discrepancies and avoids a negative event in the context.

In particular, embodiments address identification of discrepancies in terms of conflicting contextual information perceived by the AI systems (i.e., position, distance, classification, etc.); calculation of a new value in the form of global information (GI) for the features that have discrepancies among AI systems; and the use of this, new global information for resolving in real time the discrepancies and thus potentially, avoiding negative impacts in the context through technical action. The examples of a technical action may include: deactivating AI components. In the context of autonomous vehicles other technical actions could change the movement of a vehicle which the AI is controlling and/or alert an operator/manager, such as "brake", "stop in 100 metres", "move forwards by 100 metres" alerts, or actions. These would all have the effect of ignoring/or disregarding the information/device.

The global information can be presented to a manager of the AI system with the discrepancy, used to adjust the value provided by that system or used in any other way. In some embodiments, the global information is to replace the value provided by that AI system with a value from the global information that is a more trusted value. In other embodiments, a value from the global information may be used to adjust the "local" value provided by that system.

To give a more advanced calculation, each value used to create the global information may be modified by a confidence score, for example for the AI system which provided the value. Thus, in cases with no clear single discrepancy, i.e. with many AI systems and different types of conflicting information received, the method would result in utilising the confidence scores to provide a clearer discrepancy. This means that if the systems 1 and 2 perceive different values, but 1 has more confidence, 2 should use information more close to 1.

The confidence score may be formed of a plurality of different partial confidence scores added together, preferably wherein the partial confidence scores are individually weighted.

The confidence score may be based on AI ethics guidelines. For example, if an AI system is known not to follow such guidelines, it may receive a lower score. Other factors may be taken into account, such as past discrepancies of the AI system. Additionally or alternatively, certain values may be given more weight. For example, a value indicating a potentially dangerous situation (such as a high speed or am unusual value) or fragile object classification (person rather than vehicle) may be weighted with a coefficient of more than 1, or may be weighted more than other values.

The method may further comprise deactivating the part of the AI system providing the value which is replaced by the global information.

The logs may provide a stream of data values, which may generally or sometimes be time-separated values for the same feature. The method may further comprise a first step of checking for a change in values in the logs before identifying any discrepancies between the values.

The method may further comprising generating a report based on the logs and the global information and feeding the report to an auditor.

In one embodiment, global information for a feature F is calculated as:

$$GI\_F = \frac{\sum_{k=1}^{m} cs_{k,F} * \text{valuek\_F}}{m - \sum_{k=1}^{m}(1 - cs_{k,F} \text{ where } cs_{k,F}! = 1)}$$

Where m is the number of AI systems that have information about the feature F, $cs_{k,F}$ is the stored confidence score of the AI system with ID k for the feature F, and valuek_F is the value of the AI system k for the feature F.

As mentioned previously, the method can be used with any AI systems that each provide a value for the same feature, whether that is financial, related to other non-physical data, or physical. In one embodiment, the AI systems determine a position of an object or identify an object, and the feature is a determined position of an object, or an identification of an object.

The AI system receiving the global information may control the movement and/or position of an entity, and receipt of the global information may lead to a change of a movement and/or position of the entity. For example, the AI system may be part of a vehicle, and the global information may be translated into action such as a lane change or braking of the vehicle.

In this context, and as mentioned above, the feature may be a position of an object. The simplest reconciling may be addition of any numerical properties, and division by the number of AI systems. For example, X, Y (and Z) co-ordinates may be added separately. In an alternative embodiment, the reconciling between values may use all the triangles that can be formed between locations of any three AI systems and which include the object within the triangle, part global information for each triangle being calculated from the three AI systems in that triangle, and then overall global information being calculated by combining the part global information for each triangle.

According to an embodiment of a further aspect of the invention, there is provided a system to reconcile values of a feature, each value being provided by a different artificial intelligence, AI, system, the system comprising memory and a processor arranged to provide; an information collector to collect logs from the different AI systems, each log including a value of the feature; a conflict auditor to identify any discrepancy between the values, and when there is any discrepancy to create global information from the values, the global information taking into account the values, and a global information activator to send the global information to an AI system when the global information differs from the value of that AI system, to replace the value provided by that AI system.

A (trusted) AI network may comprise a group of autonomous AI systems linked to a resolution system as defined above.

According to an embodiment of a further aspect of the invention, there is provided a computer program comprising instructions which, when the program is executed by a computer, cause the computer to carry out the method detailed above.

An apparatus or computer program according to preferred embodiments of the present invention may comprise any combination of the method aspects. Methods or computer programs according to further embodiments may be described as computer-implemented in that they require processing and memory capability.

The apparatus according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program including instructions which, when loaded onto at least one computer configure the computer to become the apparatus according to any of the preceding apparatus definitions or any combination thereof.

According to a further aspect there is provided a program including instructions which when loaded onto the at least one computer configure the at least one computer to carry out the method steps according to any of the preceding method definitions or any combination thereof.

In general the computer may comprise the elements listed as being configured or arranged to provide the functions defined. For example this computer may include memory, processing, and a network interface.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. Apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results. Multiple test script versions may be edited and invoked as a unit without using object-oriented programming technology; for example, the elements of a script object may be organized in a structured database or a file system, and the operations described as being performed by the script object may be performed by a test control program.

Elements of the invention have been described using the terms "information collector", "conflict auditor" etc. The skilled person will appreciate that such functional terms and their equivalents may refer to parts of the system that are spatially separate but combine to serve the function defined. Equally, the same physical parts of the system may provide two or more of the functions defined.

For example, separately defined means may be implemented using the same memory and/or processor as appropriate.

AI systems can take autonomous decisions in different situations and these decisions can provoke a negative impact (i.e. in people or society such as an accident, discrimination, etc.). The AI systems are considered black boxes or opaque software tools that are difficult to interpreter, explain, and whose behaviour is difficult to modify.

Analysing and redressing AI system behaviour in isolation is a huge technological challenge that needs resolution to provide safe, beneficial and fair use of AI.

The inventors have appreciated that collective knowledge that can be obtained from different systems can help to determine why a specific action was taken, identify possible errors or unexpected results and avoid negative impacts of an AI in a particular situation or context.

Therefore, one improvement provided by the invention embodiments is a way to analyse a set of AI systems that are in a given context where a negative impact could happen. This analysis is based on using data from different systems to identify discrepancies between the systems/data, and may detect what systems have errors or are responsible for these discrepancies and even redress this responsibly to avoid negative impact. Moreover, possible penalization and redress of AI systems will allow the minimization of risk in future contexts with similar information. In this sense, redress may be the deactivation of a faulty component, and the use of the GI sent by the system. Penalization is more related to the confidence for the faulty AI component. If an AI component is deactivated, this may decrease the confidence score.

In embodiments accountability is focused on analysing a particular context (situation or perception), where more than one AI systems is present, to understand and look for who or what is responsible for a potential event (generally, with negative impact) or the occurrence of an incident in this context, and preferably apply a mechanism that prevents the harm, reducing the negative impact, and minimizing the risk of repeating an event. Hence for example, an incorrect position or other feature determined by an AI system may be rectified.

Put another way, embodiments disclose a way to analyse and rectify the behaviour of different AI systems that are in a given context where a negative impact could happen. They are based on tracing data from different systems to identify discrepancies amongst them, detecting a source (responsibility) for these discrepancies and redress the situation to resolve such discrepancies for the purposes of self-regulation or auditability.

The redress mechanism is a technical action that allows rectification of the responsible AI component/system and thus may eliminate or minimize the risk of negative impacts in the context.

One main benefit is to be able to trace back incorrect or inconsistent inputs that could generate a negative impact in a context by considering AI system's outputs. Thus, tracing the collective knowledge from different AI systems, it can be clarified why an AI system took a specific action, identify the possible errors, redress them, and eliminate or minimize future unexpected outputs for AI system's auditability purposes.

Embodiments focus on the analysis and reconciliation of conflicting information arising from a context or situation (for example a physical situation or setting) where there are two or more AI systems and a negative impact could happen given that one of the systems may interpret a feature of the context incorrectly.

FIG. 1 depicts a general embodiment in which values from different AI systems are reconciled. In step S10, logs are collected from the AI systems. Here, each AI system may send logs repeatedly. Each log is a set of values for the same set of features (such as physical coordinates or other data points). The resolution system may align these logs temporally and by features.

In S20, the resolution system identifies any discrepancies between values of the same feature (and at the same time) from these different logs. For efficiency, the resolution system may check first that there has been any change in the value, and if not, the method may be discontinued.

In S30, the system creates global information (GI) from the values (if there is a discrepancy). For example, if 4 systems give one value and a $5^{th}$ system gives a different value for the same frequency, then GI is created. The GI may be a kind of average, or weighted average, of the values, or it can be calculated in any other way from some or all of the values. For example, each AI system may be given a confidence score, the confidence scores providing the weights (for example between 0 and 1).

In S40, the GI is sent to any AI system with a discrepancy. In fact, the GI may be sent to all the AI systems, and each AI system may include a detector to identify the difference between its perception and the GI received. These detectors may simply give priority to the GI (over the perception of the AI system) if there is any difference. Hence the GI is adopted in the AI system.

Figure 3:
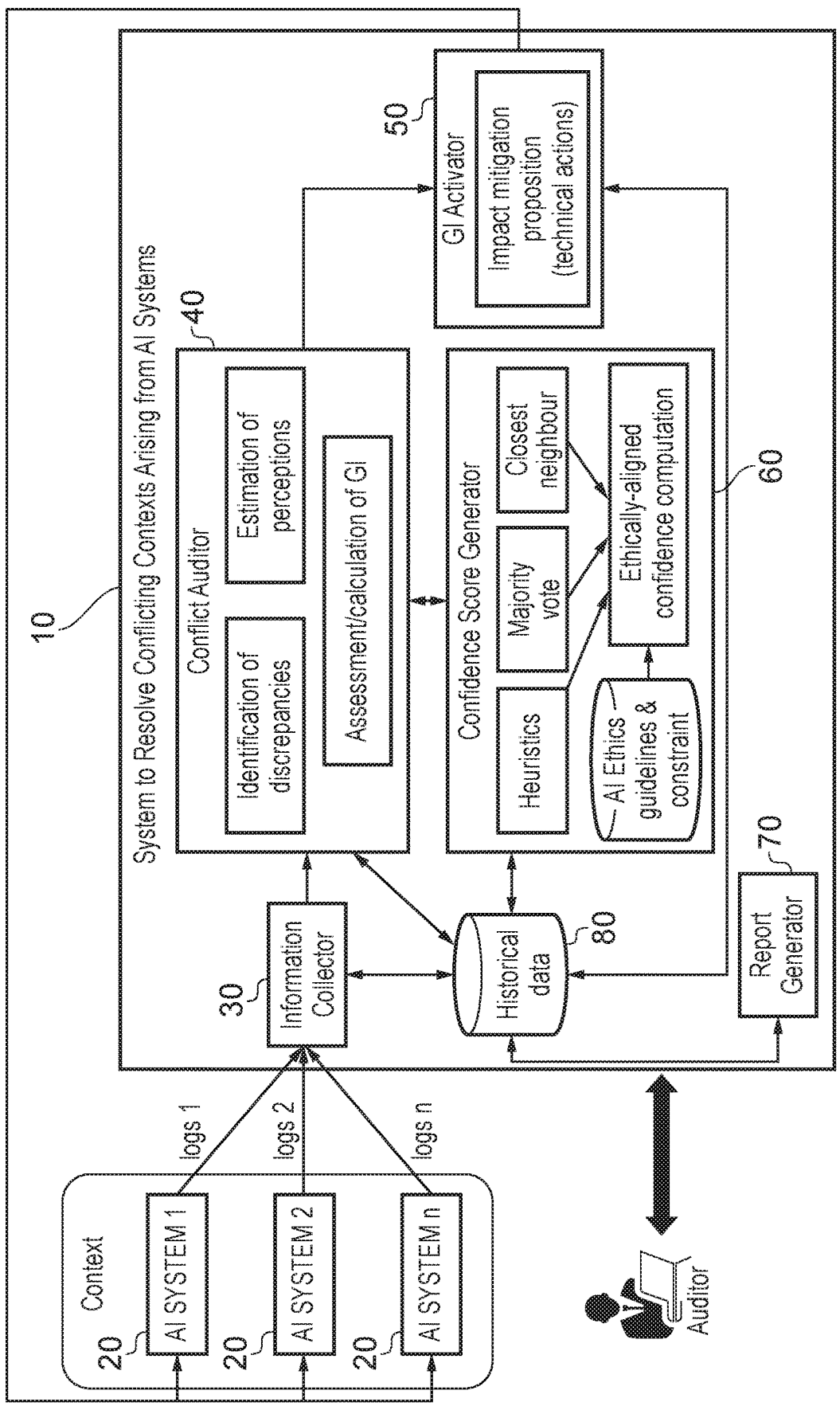
FIG. 3 is a block diagram of a specific invention embodiment.

FIG. 3 depicts an overview of a resolution system for use with AI systems and its interactions with external elements. On the left, different AI systems in a context are depicted and an auditor. On the right, there is the system itself.

In more detail, the elements of FIG. 3 are:

System to resolve conflicting contexts arising from AI systems: This may be an independent computer system where AI systems will send information in real time or may form part of an existing server that already has communication with the AI systems.

In essence, the resolution system receives information from a set of two or more AI systems (logs), detects discrepancies among the information received and calculates global information (GI) that may be used to activate or deactivate specific components of the AI systems to avoid a negative impact in the context (such as the physical setting in which the AI systems operate).

Additionally, the system can produce a dynamic report with the summary of the exchanged information and the technical orders that have been sent to the AI systems to avoid negative events in the context. This report could be analysed to allow an auditor or external entity to take actions in the AI systems (for example, redesign an AI component, replace a technical device—i.e., a sensor, etc.).

AI systems The AI systems are autonomous systems that carry out autonomous decisions in a defined context. One AI system could be a smart object: an object equipped with different type of sensors that enable a virtual perception of the surrounding and embedded with a processor and connectivity that enhance its interaction with other smart objects and external servers.

These AI systems send different logs (information about a set of features) to the resolution system to resolve conflicting perceptions of the context arising from the AI systems and will receive in return orders that may be translated to technical actions to avoid negative impact in the context.

Examples of AI systems that could be considered are (or from part of): robots, self-driving vehicles (whether on land, on water on in the air), drones, industrial bots, virtual assistances, home automation components, etc.

Auditor An optional external entity may analyse (manually or automatically) the report or information produced by the resolution system to resolve conflicting perceptions of context arising from AI systems to rectify or prevent specific behaviours of the AI systems in next versions or in the future.

The three major components within the resolution system 10 are described in more detail hereinafter and comprise:

Conflict auditor 40: This component is supplied with information by an information collector collecting logs from the AI systems 20 and also receives historical data. It has three modules, to identify discrepancies, to estimate perceptions and to calculate a global information (GI) using the information perceived by the AI systems.

Confidence Score Generator 60: This component may use heuristics, majority vote and closest neighbour modules, along with historical data to calculate a confidence score for each AI system using a multi-method approach and perform confidence computation based on stored standards or guidelines, such as ethically-aligned confidence computations based on published AI ethics guidelines. These may be confidence computations based in other standards, e.g. health and safety/critical systems where standards/guidelines apply.

For example, the entire system may be ethically-compliant (not only the confidence score computation) by following appropriate guidelines and by incorporating such guidelines into the original functionality/mechanisms of the system. For example, traceability (i.e. tracking where the data is originating and logging the trail) may be one of the key requirements. This also leads to accountability of the system in terms of faulty data (sources) and the ability to redress. The system may include a knowledge database of ethical guidelines that include the definition of principles to be followed.

GI Activator 50: This component will send the technical actions or orders to specific AI systems to try to resolve the conflict in the context.

Moreover, the resolution system includes other elements for whole system support. Their detailed description is out of the scope of this description:

Information collector 30: receives the inputs (logs) from the different AI systems and may carry out different processes to normalize and standardize the information received, such as formatting and rounding.

Report Generator 70: allows external systems or users to check information received, produced and sent by the resolution system.

Historical data 80: this local or remote storage component stores and traces all the information received, produced and sent by the different components of the system.

Figure 4:
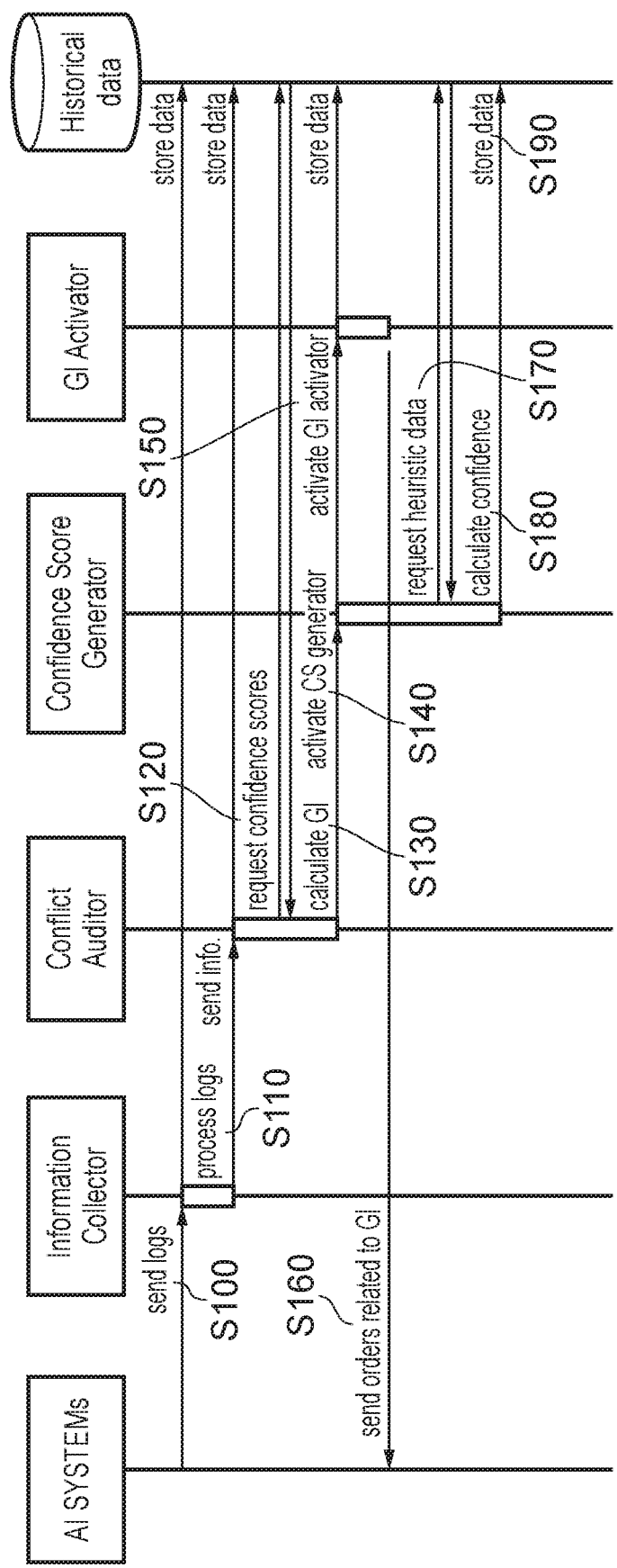
FIG. 4 is an overview sequence diagram of a resolution system.

The main sequence diagram of a resolution system according to one embodiment is depicted in FIG. 4.

The sequence diagram starts at step S100 when a set of AI systems send their logs in a context. In step S110, the information collector processes the logs and send the new information to the conflict auditor. In step S120 the conflict auditor requests the historical confidence scores of each AI system based on a specific feature (for example taking into account previous de-activation) and with this information calculates the global information (GI). In step S130 the GI will be calculated for use and for storage as historical data. Then, the conflict auditor activates the processes of the GI activator (S140) and the conflict score generator (S150).

The GI activator sends orders as necessary to the AI systems to deactivate AI components of the AI systems that have wrong information (different from the GI) in step S160.

The confidence score generator will request heuristic data (S170) and update the confidence scores of the system, potentially making sure that they are ethically aligned using a database of standard/published AI ethics guidelines and based on a multi-method approach (S180). This information is then stored into the historical database.

Next, the processes and methods of each component are detailed.

Information Collector 30:

This component may be needed to carry out any of the following functions of receive information from the different AI systems, normalize and standardize, store the raw and processed information, and resend the processed information of a specific event to the conflict auditor. An event may be defined as something that occurs (or is perceived) in a given time by an AI system. This is a set of perceptions that an AI system observes in a context.

Historical Data 80:

This component may be a database storing all information and data that is received, sent and processed by the system. For example, the historical data could include: the logs or raw data sent from the AI systems, the GI information calculated by the system to resolve conflicting contexts arising from AI systems, the ethically-aligned confidence scores of each AI system for each feature, etc.

Conflict Auditor 40:

The conflict auditor is programmed to detect discrepancies among the information received and to calculate global Information (GI) for each feature that has discrepancies. The GI will be used to avoid negative impacts in the context.

Figure 5:
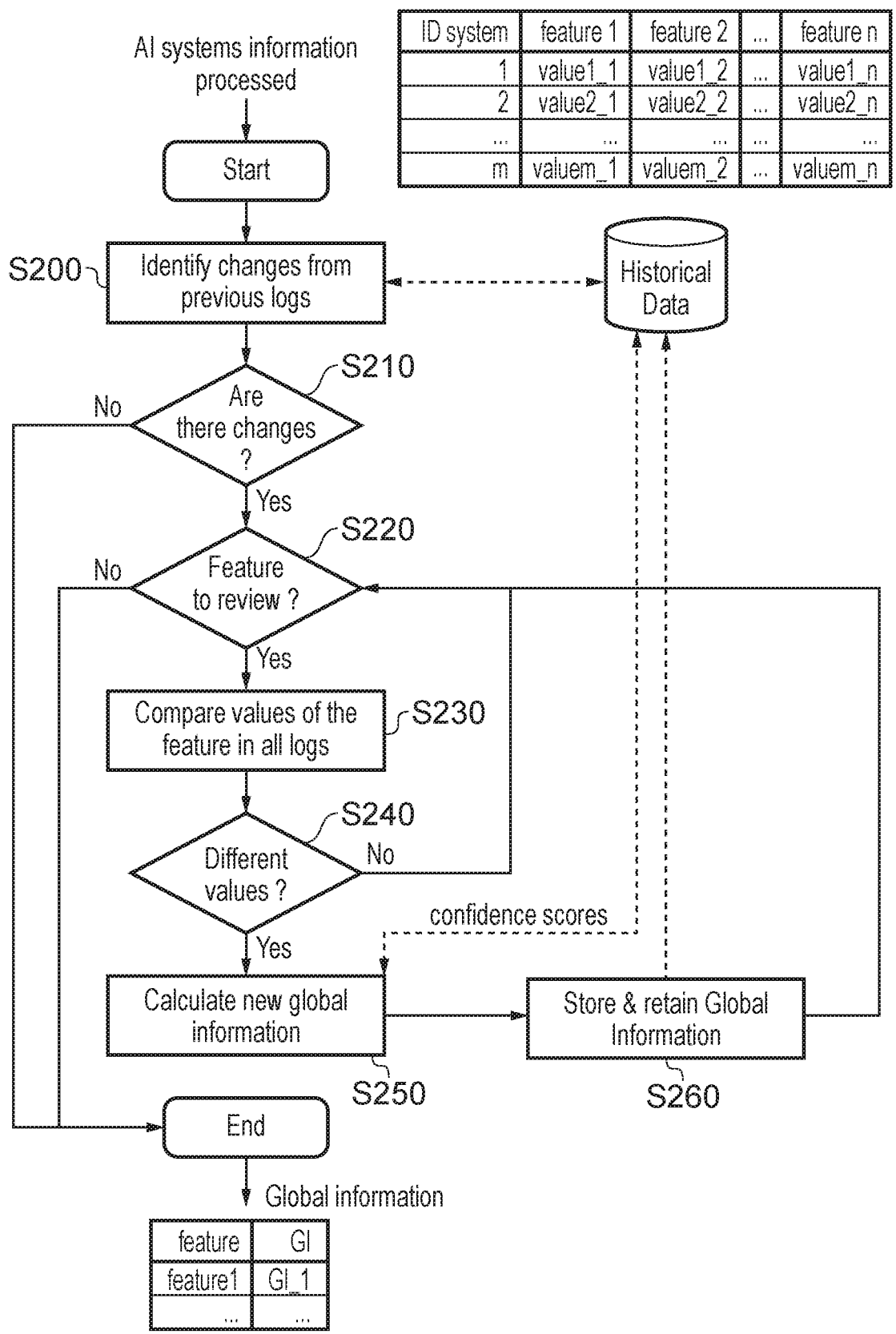
FIG. 5 is a flowchart showing a workflow of a conflict auditor.

The workflow of the conflict auditor is illustrated in FIG. 5. At the top, there is a table with an event defined by n features and perceived by m systems.

The process starts when the conflict auditor receives the AI systems' information potentially as processed by the information collector.

The information received will be a matrix of size: m*n where m is the number of AI systems in the context and n the number of features detected by each AI system. For example; the matrix may have the form shown in FIG. 6, in which the first column is the ID of the AI system and value A_B is the B$^{th}$ feature of the A$^{th}$ AI system.

Next, the steps of the workflow will compare the logs receives with the previous ones stored by the historical data component to identify changes (S200). If there are changes (S210), the conflict auditor will carry out the next tasks for each feature to review (S220) in the information received as follows. First the conflict auditor compares values of the feature in all the received logs (S230). If different values are detected (S240), global information will be calculated (S250) using confidence scores from the historical data. This information will be stored and retained in memory to be sent to the confidence score generator and the GI activator (S260). Once all features are checked (no feature to review at S220), the process will end. Two outputs could be generated: an empty list when no changes are detected from the previous logs received or there are no discrepancies in the perceptions, or a list of features that have discrepancies and the new global information calculated by the component.

An example of an output when feature1 has discrepancies among the values of this feature detected by the AI systems is shown in FIG. 7.

The calculation of the global information (GI_1 for feature1) may be calculated as:

$$GI\_1 = \frac{\sum_{k=1}^{m} cs_{k,1} * \text{valuek}\_1}{m - \sum_{k=1}^{m}(1 - cs_{k,1} \text{ where } cs_{k,1}! = 1)}$$

Where: m is the number of AI systems that have information about the feature1, $cs_{k,1}$ is the stored confidence score of the AI system with ID k for the feature1, and valuek_1 is the value of the AI system k for the feature1.

Therefore, in this example, AI systems with more confidence (high ethically-aligned confidence score and/or fewer deactivations) will have more weight than AI systems with less confidence for a specific feature. If $CS_{R,1} \neq 1$ for all the AI systems then the denominator is m. Otherwise, for each AI system where $CS_{R,1} \neq 1$, then $CS_{R,1}$ is subtracted from 1 and the results are added together and then subtracted from m to make the denominator.

Figure 8:
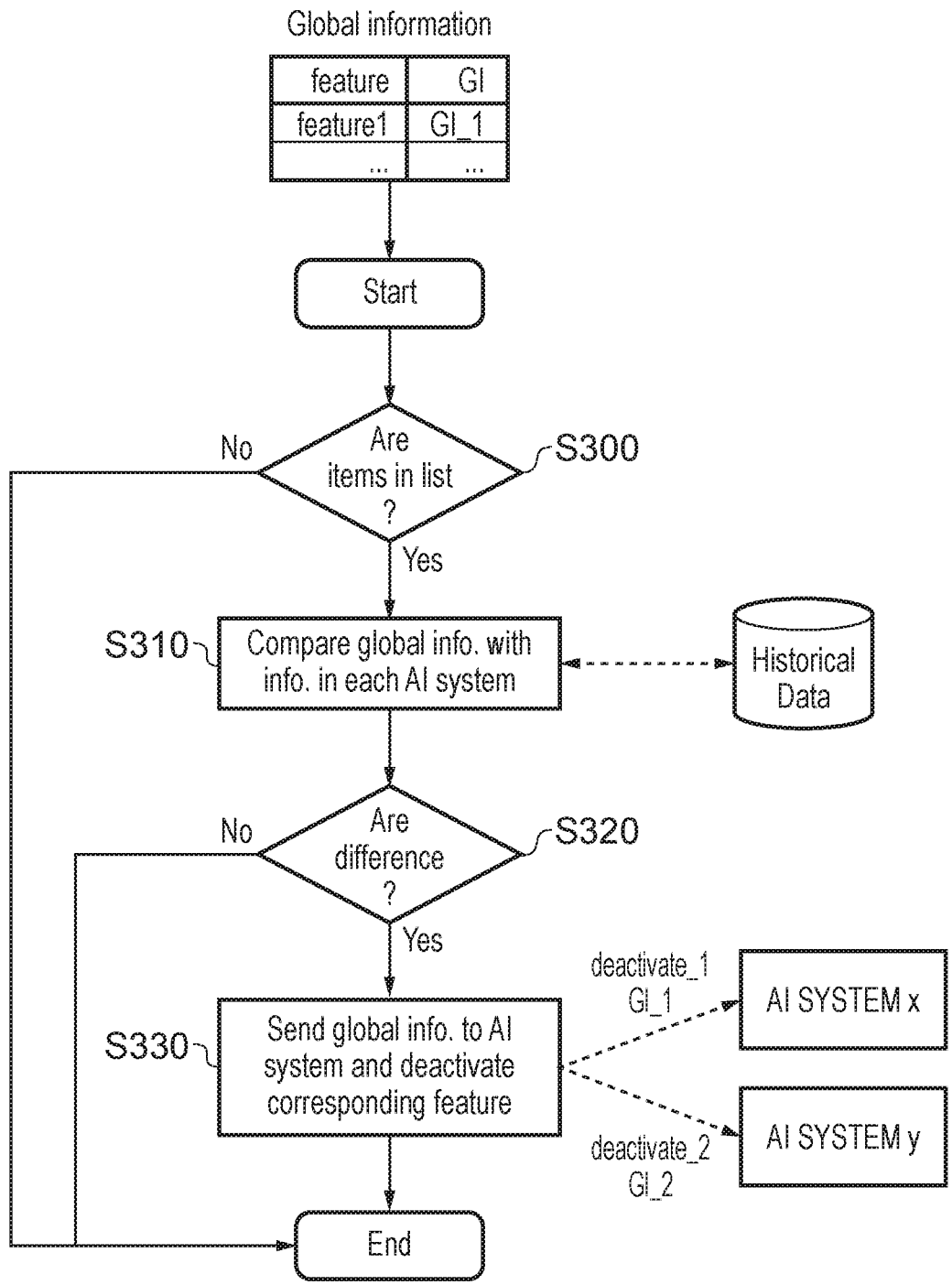
FIG. 8 is a flowchart showing a workflow of a global information (GI) activator.

GI Activator:

The GI activator receives the global information (GI) of each feature calculated by the conflict auditor and starts the workflow to send orders to the different AI systems and thus, to avoid negative impact in the context (as shown in FIG. 8).

Once the GI activator receives the data from the conflict auditor, the component checks in step S300 if there are items in the list received. An item in the list indicates that there is a discrepancy for a specific feature. If a new GI was calculated, this indicates that discrepancies were detected.

If there are discrepancies, for each feature and GI associated, the GI activator compares the GI with the information perceived by each AI system (for that, historical data is checked) in S310.

If there are differences between the GI and the perceived information found in step S320, the GI Activator will send an order to the specific AI system in S330 to deactivate its AI component that perceives the feature different from the global information.

For example:

There are three AI systems: A, B and C. A and B detect an object as a car. C detects the same object as a pedestrian. The global information calculated by the conflict auditor determines that the object is a car given the confidence of each AI system. The GI activator will send to the AI system C the order to stop its classification component and take into account the calculated GI as the feature of classification: car.

The order to stop the classification component (or any other component producing a faulty value in an AI system) may have any suitable form. For example, the resolution system could create atomically technical orders that the AI system has to interpret. A technical order could have the format: "subject+order+arguments".

Subject: is the component to apply (component of the system).

Order: the technical result (stop, update, continue, etc.) for the faulty AI component Arguments: values to apply. This means, for example, the GI to apply (or a correction based on a GI).

The GI may be applied in technical orders that may be translated in actions in each AI system: for example, change the lane, brake a car, etc. These actions could avoid a negative impact in a context (i.e., an accident).

The faulty AI component may include a mechanism to update its functionality based on the GI, in the form of recalibration or "auto-learning".

Confidence Score Generator

The confidence score generator is to provide an ethically-aligned confidence score for each AI system for each feature based on a multi-method approach and by using the database of standards/published AI ethics guidelines.

The workflow of the confidence score generator starts when the conflict auditor ends its workflow and sends the global information and AI systems information as processed (processed logs received with details perceived by each AI system). With this information, the confidence score generator calculates a set of partial confidence scores, using different techniques.

Three parallel processes may be carried out here to calculate three partial confidence scores, but other techniques could be added or only one or two techniques could be used.

Heuristic method: takes into account the historical data to calculate a partial confidence score for each feature of each AI system. Different techniques could be used to implement this method. For example, a machine learning or deep learning model could be created using historical data to predict the confidence of an AI system or a set of AI models could be used to calculate the confidence of each feature.

Majority vote method: Takes into account what other AI systems detect and perceive about a specific feature. Thus, if the majority of AI systems detect a specific value for a feature, the partial score related to the majority vote will be increased. Otherwise, the confidence score will be decreased.

Closest neighbour: will be applied in features that have a scale or a countably infinite collection of norms. The scale could be applied to numeric features (i.e., distance) and categorical features that have a scale with relevance (e.g., in a classification of objects, a pedestrian will be more important than trees or animals).

After the calculation of the three partial confidence scores, the confidence score generator will calculate the final confidence score of each AI system for each feature. The equation for the system K could be:

$$cs_k = a*cs_{k,heuristic} + b*cs_{k,majority} + c*cs_{k,neighbour}$$

Where: $cs_k$ is the final score of the AI system k in a specific feature, $cs_{k,heuristic}$ is the partial confidence score using the heuristic method, $cs_{k,majority}$ is the partial confidence score using the majority vote method, $cs_{k,neighbour}$ is the partial confidence score using the closest neighbour method, and a, b, and c are scores to give more or less importance to the previous partial scores.

Figure 9:
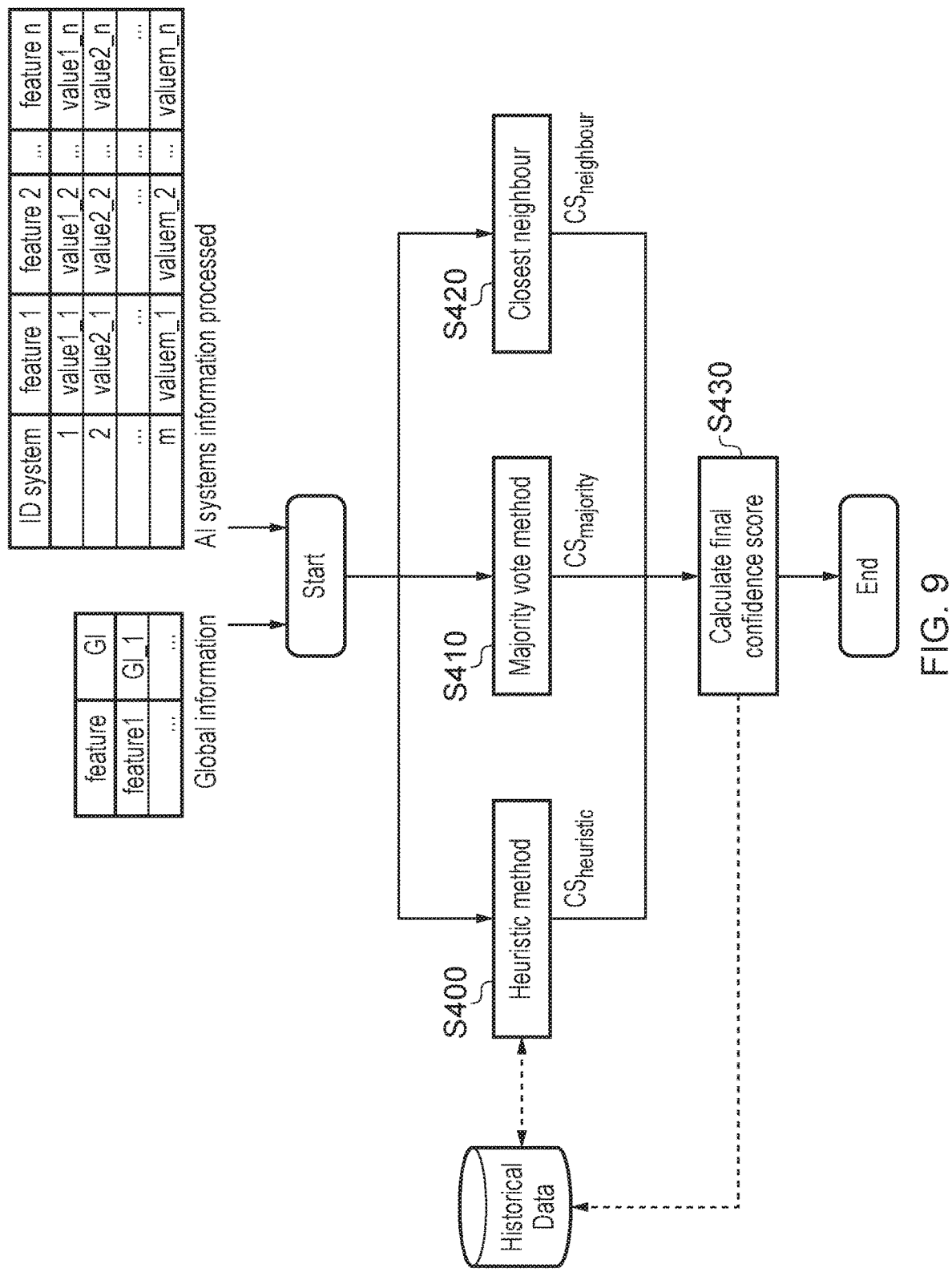
FIG. 9 is a flowchart showing a workflow of the confidence calculator.

In summary, the workflow to calculate the confidence score is illustrated in FIG. 9.

The heuristic method S400, majority vote method S410 and closest neighbour method S420 take place in parallel using the GI and systems information. The heuristics method also uses historical data. The results for the methods are combined in S430 to give a final confidence score which is stored in the historical data.

Worked Example:

The example relates to a use case of transport. Specifically, it considers a road where there are different autonomous vehicles (AI systems with a set of AI components to detect objects, positions and classification of objects, etc.).

Some usual AI systems to detect position are based on radar, GPS, LIDAR, and Inertial measurement units. Examples can be found at: <URL: https://en.wikipedia.org/wiki/Vehicle_tracking_system>.

Figure 10:
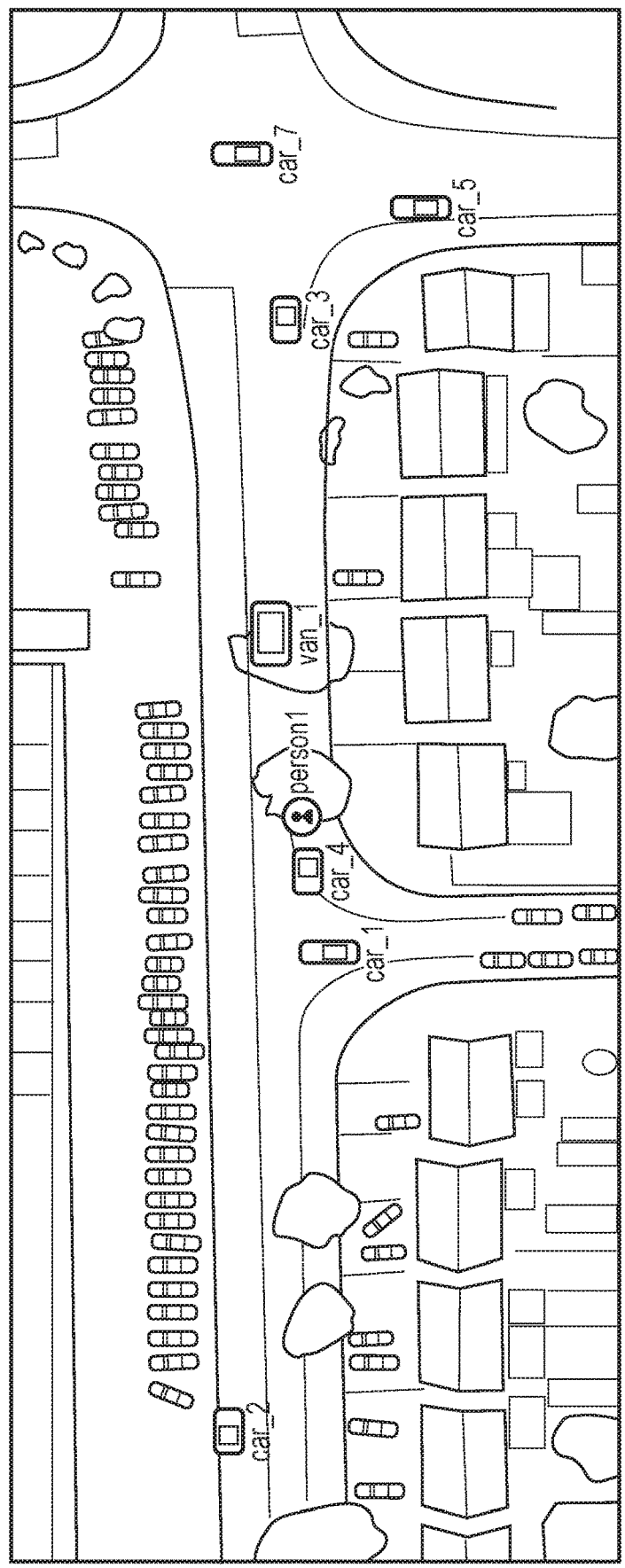
FIG. 10 is an overhead view of a use case scenario.

An accident could happen because one or more of the vehicles perceives a wrong position for an object (e.g., a pedestrian) or because an AI system classifies a pedestrian incorrectly. An example scenario is depicted in FIG. 10. Assume north is shown as up in the FIG. 10. Car 1 is travelling north out of a side road onto an east-west main road. Car 2 is travelling east on the main road towards the side road. Car 3 is travelling west on the main road towards the side road. Car 4 was travelling west on the main road and is turning south down the side road from the main road. Person 1 is on the main road just to the east of the side road and of car 4.

Figure 11:
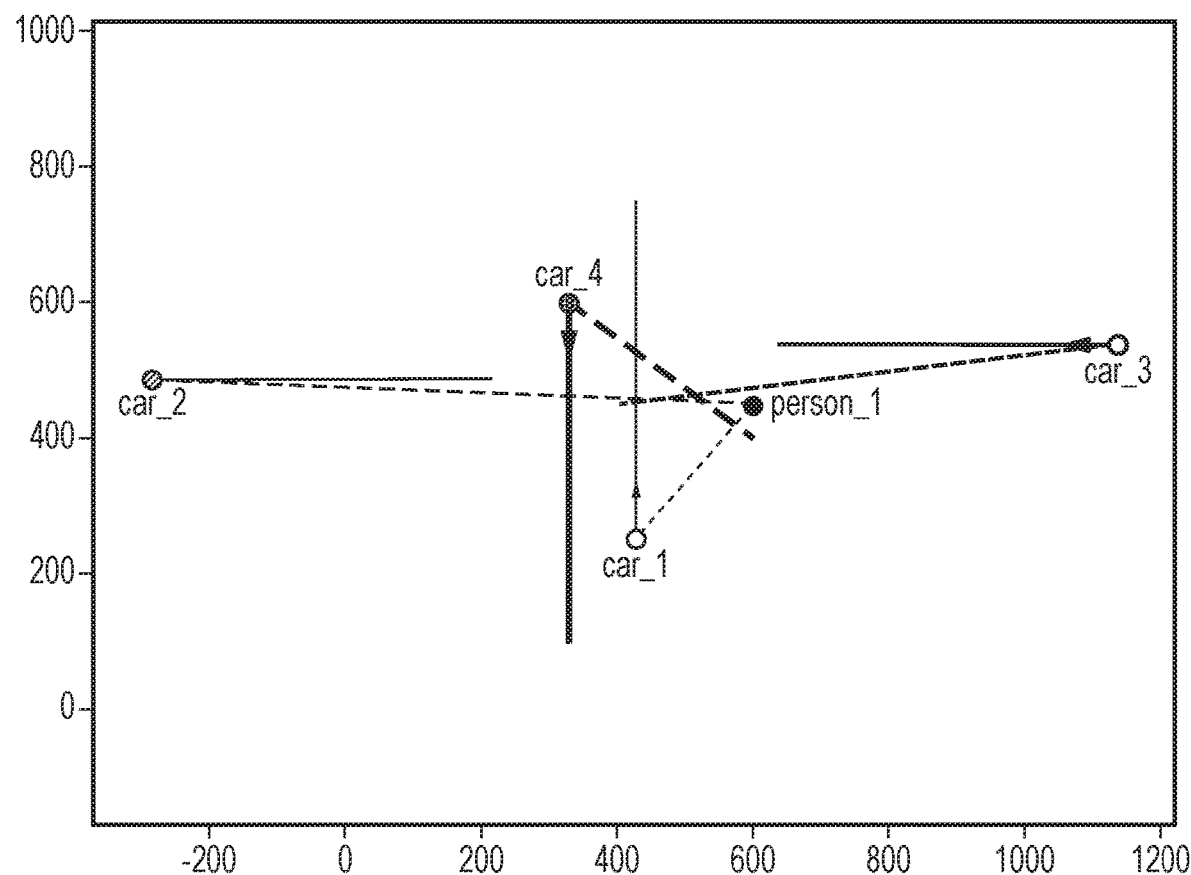
FIG. 11 is a graph of a use case scenario.

For the worked example, consider the scenario graph as shown in FIG. 11.

In FIG. 11 the four cars and person are objects which are shown as points. Solid lines with arrows represent the direction of the object. For example, car_1 moves to the north, and car_2 to the east, as previously explained.

Dashed lines are the perception (vision) of a car for the person_1. For example, car_1 and car_2 see the person_1 at the correct position (the dashed line ends at the correct place), but car_3 and car_4 have a wrong perception of the person_1 and believe that the person is at the end of the dashed line.

Taking into account the previous information, the scenario is as follows:

car_1 and car_2 detect the person_1 in the right position car_3 and car_4 detect the person_1 in the wrong position First, in order to resolve the conflicting information arising from the AI systems, the vehicles (or AI systems) will send the information that is perceived by them to the information collector. The information collector component will normalize and standardize the logs received to the same format, and will check that the logs received are for the same context and time. For example, car_1 sends the information shown in FIG. 12 in JSON format (relevant information only is shown in FIG. 12):

The information indicates that the car_1 in the position (428,400) views or detects person_1 in the position (600, 200).

The conflict auditor receives the information from all the cars. For each feature, it will detect if there are discrepancies. The component will detect discrepancies in the position for person_1 because car3_detects the person position (400, 450) and car_4 in position (600, 400).

X_direction is the direction of a car (where it is moving) related to the x axis.

For example, in the table, car_1 is not moving in x axis, is going to the north (this would be included in a y_direction feature, which is not shown.

Information received by the conflict auditor is shown in FIG. 13.

To calculate the Global information of the person_1 position, the conflict auditor takes into account the information of each vehicle (car in this example) and its previous confidence scores.

The worked example is based on a method that is inspired by the barycentric coordinates of the person with respect to the different triangles that vehicles can define. The confidence and accuracy of this method is higher than when simply combining all inputs. Creating the triangles is a way to check the position perceived by each vertex.

Figure 14:
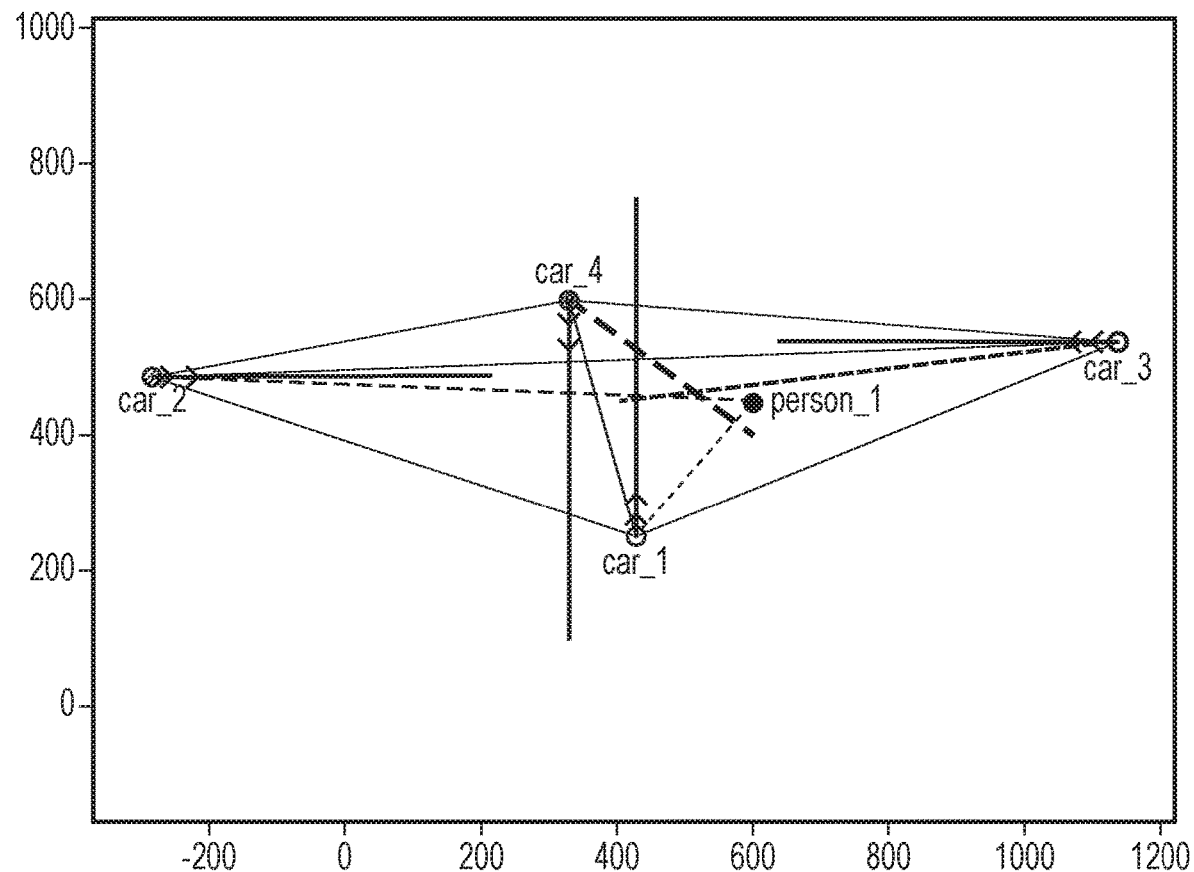
FIG. 14 is a graph showing Barycentric coordinates of the use case scenario.

First, the conflict auditor detects what triangles defined by cars include the person_1 inside or close to them (considering a margin such as 40% of the areas). In the example, four triangles will be detected, as shown in FIG. 14:

car_1car_3car_4→triangle 1
car_1car_3car_2→triangle 2
car_1car_4car_2→triangle 3
car_3car_4car_2→triangle 4

For each triangle, a part-Global information (GI) is calculated. The part-Global information (GI) for the features x and y and triangle t is:

$$GI\_xt = \frac{\sum_{k=1}^{3} cs_{k,x} * valuek\_x}{3 - \sum_{k=1}^{3}(1 - cs_{k,x} \text{ where } cs_{k,x}! = 1)}$$

$$GI\_yt = \frac{\sum_{k=1}^{3} cs_{k,y} * valuek\_y}{3 - \sum_{k=1}^{3}(1 - cs_{k,y} \text{ where } cs_{k,y}! = 1)}$$

Where:
t is a specific triangle detected,
k is the ID of the AI system (only 3 AI systems will considered by triangle),
x is the feature x,
y is the feature y,
csk,x is the confidence score of the AI system with ID k for the feature x, and
csk,y is the confidence score of the AI system with ID k for the feature y Consider that all the cars have a confidence of 1 for each feature, apart from car_3 that has a confidence of 0.4 for the feature x, then the part-Global information for each triangle will be:

Triangle 1 (car_1car_3car_4)

$$GI_{x,1} = \frac{1*600 + 0.4*400 + 1*600}{3 - (1 - 0.4)} = 566.67$$

$$GI_{y,1} = \frac{1*450 + 1*450 + 1*400}{3} = 433.33$$

Triangle 2 (car_1car_3car_2)

$$GI_{x,2} = \frac{1*600 + 0.4*400 + 1*600}{3 - (1 - 0.4)} = 566.67$$

$$GI_{y,2} = \frac{1*450 + 1*450 + 1*400}{3} = 433.33$$

Triangle 3 (car_1car_4car_2)

$$GI_{x,3} = \frac{3*600}{3} = 600$$

$$GI_{y,3} = \frac{3*450}{3} = 450$$

Triangle 4 (car_3car_4car_2)

$$GI_{x,4} = \frac{1*600 + 0.4*400 + 1*600}{3 - (1 - 0.4)} = 566.67$$

$$GI_{y,4} = \frac{1*450 + 1*450 + 1*400}{3} = 433.33$$

Finally, the Global information for the position of the person is the median of all the triangles.

$$GI_x = \frac{3*566.67 + 600}{4} = 575$$

$$GI_y = \frac{3*325 + 450}{4} = 437.5$$

Other methods (not only the median) are also possible. For example, the triangles in which car_3 (car with lower confidence score) participate could not be considered or have less relevance to obtain the final Global information.

$$GI_x=600 \ GI_y=450$$

The GI activator receives the GI calculated and compares with the information received from the AI systems by the cars. Given that the GI is different from the received logs of the AI systems, the GI activate may deactivate the AI components of all the cars to avoid an accident. If the last calculation is used, only the car_3 will deactivate its AI components for features x and y.

Figure 15:
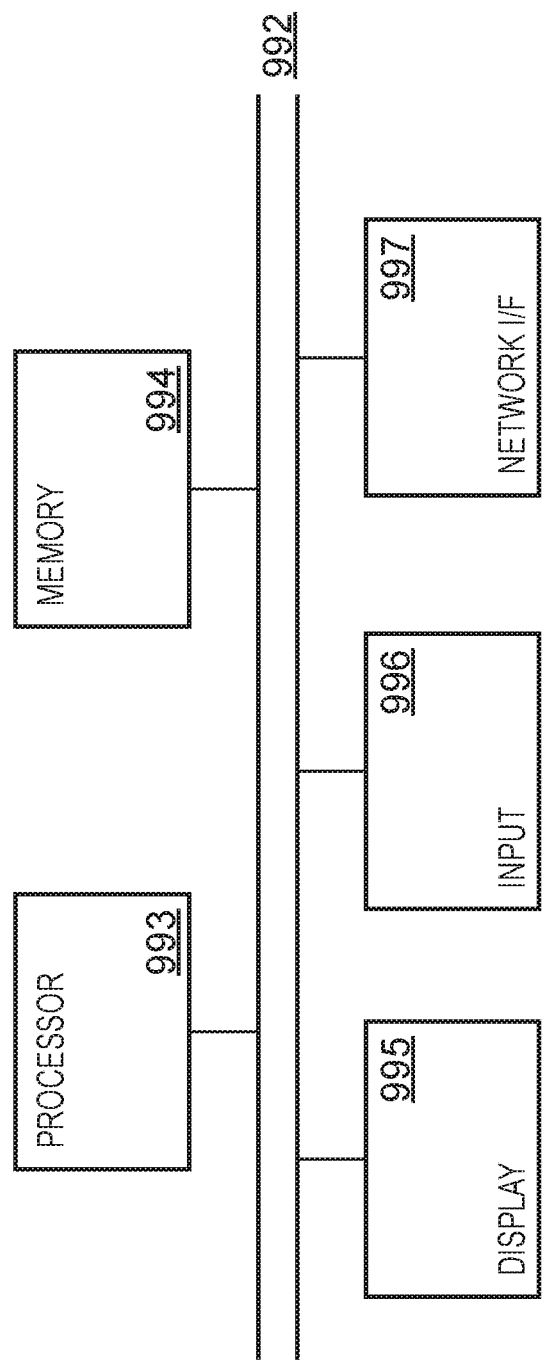
FIG. 15 is a diagram of suitable hardware for implementation of invention embodiments.

FIG. 15 is a block diagram of a computing device, such as a data storage server, which embodies the present invention, and which may be used to implement a method of resolving conflicts in values between AI systems. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of modules, such as the information collector, conflict auditor and global information activator described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data (such as the values from the AI system) stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices (such as the AI systems themselves) via the network. The network I/F 997 may control data input/output from/to other apparatus via the network. Other peripheral devices such as microphone, speakers, printer, power supply unit, fan, case, scanner, trackerball, etc. may be included in the computing device.

The information collector 30 may comprise processing instructions stored on a portion of the memory 994, the processor 993 to execute the processing instructions, and a portion of the memory 994 to store values during the execution of the processing instructions. The output of the information collector may be stored on the memory 994 and/or on a connected storage unit, and may be transmitted/transferred/communicated to the historical data store/report generator.

The conflict auditor 40 may comprise processing instructions stored on a portion of the memory 994, the processor 993 to execute the processing instructions, and a portion of the memory 994 to store data relevant to identified discrepancies during the execution of the processing instructions. The output of the conflict auditor may be stored on the memory 994 and/or on a connected storage unit, and may be transmitted/transferred/communicated to the historical data store/report generator.

The global information activator 50 may comprise processing instructions stored on a portion of the memory 994, the processor 993 to execute the processing instructions, and a portion of the memory 994 to store results of calculations and GI during the execution of the processing instructions. The output of the global information activator may be stored on the memory 994 and/or on a connected storage unit, and may be transmitted/transferred/communicated to the historical data store/report generator.

Methods embodying the present invention may be carried out on a computing device such as that illustrated in FIG. 15. Such a computing device need not have every component illustrated in FIG. 15, and may be composed of a subset of those components. A method embodying the present invention may be carried out by a single computing device in communication with one or more data storage servers via a network. The computing device may be a data storage itself storing the values and GI and any intermediate results.

A method embodying the present invention may be carried out by a plurality of computing devices operating in cooperation with one another. One or more of the plurality of computing devices may be a data storage server storing at least a portion of AI system/resolution system data.

Summary:

Embodiments propose a system and methods to integrate accountability in existing AI systems. The previous description is independent of any field, so this could be applied in different business areas: finance, transport, robotics, etc. where two or more AI systems participate.

AI systems are considered black boxes even to their developers. Understanding and looking for errors or wrong information of them is a huge technical challenge and it is necessary to avoid negative impact. New mechanisms to achieve this have to be defined.

Embodiments disclose: a mechanism to trace back the incorrect or inconsistent input by considering the AI system's output; a system and method to detect and redress errors in AI systems based on the knowledge of other systems; and a mechanism that prevents harm, reducing the negative impact, and minimizing the risk of repeating a harmful event.

The invention claimed is:

1. A computer-implemented method of reconciling values of a feature, each value of the values being provided by a different artificial intelligence system of a plurality of different AI systems (different AI systems), the computer-implemented method comprising:
    collecting logs of values from the different AI systems, respectively, each log of the logs including a value of the feature from a corresponding AI system among the different AI systems;
    determining whether a discrepancy exists between the values; and
    in response to determining that the discrepancy exists between the values, creating global information from the values, the global information taking into account some values of the values or all of the values;
    determining whether the global information differs from a value of an AI system of the different AI systems; and
    in response to determining that the global information differs from the value of the AI system, sending the global information to the AI system, wherein,
the different AI systems determine a position of an object or identify an object, and the feature is a determined position of an object, or an identification of an object, and the AI system receiving the global information controls a movement and/or position of an entity among entities of a robot, a vehicle, a drone, an industrial bot, and a home automation component, so that a receipt of the global information by the AI system leads to a change of the movement and/or position of the entity.

2. A method according to claim 1, wherein the global information is to replace the value provided by the AI system with a value from the global information.

3. A method according to claim 1, wherein each value used to create the global information is modified by a confidence score for the corresponding AI system which provided the value.

4. A method according to claim 3, wherein the confidence score is formed of a plurality of different partial confidence scores added together, wherein the plurality of different partial confidence scores are individually weighted.

5. A method according to claim 3, wherein the confidence score is based on AI ethics guidelines.

6. A method according to claim 2, further comprising deactivating a part of the AI system providing the value which is replaced by the global information.

7. A method according to claim 1, further comprising checking for a change in the values in the logs before identifying any discrepancies between the values.

8. A method according to claim 1, further comprising generating a report based on the logs and the global information and feeding the report to an auditor.

9. A method according to claim 1, wherein the global information for a feature F is calculated as:

$$GI\_F = \frac{\sum_{k=1}^{m} cs_{k,F} * \text{valuek\_F}}{m - \sum_{k=1}^{m}(1 - c_{k,F} \text{ where } cs_{k,F}! = 1)}$$

where:
m is a number of the different AI systems that have information about the feature F
$CS_{K,F}$ is a stored confidence score of the corresponding AI system with ID k for the feature F
valuek_F is the value of the corresponding AI system with the ID k for the feature F.

10. A method according to claim 1, wherein the feature is a position of an object and a reconciling between the values uses triangles capable of being be formed between locations of three AI systems among the different AI systems, and which include the object within a triangle among the triangles, a part global information for the triangle being calculated from the three AI systems in the triangle, and an overall global information being calculated by combining part global information for the triangles.

11. A system to reconcile values of a feature, each value of the values being provided by a different artificial intelligence system of a plurality of different artificial intelligence systems (different AI systems), the system comprising a memory and a processor arranged to:
collect logs of values from the different AI systems, respectively, each log of the logs including a value of the feature from a corresponding AI system among the different AI systems;
execute a determination whether a discrepancy exists between the values;
in reponse to a determination that the discrepancy exists between the values, create global information from the values, the global information taking into account some of the values or all of the values;
execute a determination whether the global information differs from a value of an AI system of the different AI systems; and
in response to a determination that the global information differs from the value of the AI system, send the global information to the AI system, to replace the value provided by the AI system,
wherein,
the different AI systems determine a position of an object or identify an object, and the feature is a determined position of an object, or an identification of an object, and
wherein the AI system receiving the global information controls a movement and/or position of an entity among entities of a robot, a vehicle, a drone, an industrial bot, and a home automation component, so that receipt of the global information by the AI system leads to a change of the movement and/or position of the entity.

12. A trusted AI network comprising a group of autonomous AI systems and a system according to claim 11, wherein the group of autonomous AI systems is linked to the system.

13. A non-transitory computer readable medium storing a computer program which comprises instructions, which when executed by a computer, cause the computer to carry out the computer-implemented method of claim 1.

* * * * *